(12) United States Patent
Chateau et al.

(10) Patent No.: US 12,511,883 B2
(45) Date of Patent: Dec. 30, 2025

(54) SYSTEM AND PROCESS FOR AUTOMATIC INTERFACE RECOGNITION IN TIRE PRODUCT PROFILES

(71) Applicant: COMPAGNIE GENERALE DES ETABLISSEMENTS MICHELIN, Clermont-Ferrand (FR)

(72) Inventors: Thierry Chateau, Clermont-Ferrand (FR); Priyanka Phutane, Clermont-Ferrand (FR); Mohamed-Abbas Konate, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 396 days.

(21) Appl. No.: 18/019,151

(22) PCT Filed: Jul. 26, 2021

(86) PCT No.: PCT/EP2021/070853
§ 371 (c)(1),
(2) Date: Feb. 1, 2023

(87) PCT Pub. No.: WO2022/028937
PCT Pub. Date: Feb. 10, 2022

(65) Prior Publication Data
US 2023/0281976 A1    Sep. 7, 2023

(30) Foreign Application Priority Data

Aug. 4, 2020 (FR) ...................................... 2008268

(51) Int. Cl.
*G06V 10/776* (2022.01)
*G06T 7/00* (2017.01)
(Continued)

(52) U.S. Cl.
CPC ............ *G06V 10/776* (2022.01); *G06T 7/001* (2013.01); *G06T 7/70* (2017.01); *G06V 10/774* (2022.01);
(Continued)

(58) Field of Classification Search
None
See application file for complete search history.

(56) References Cited

U.S. PATENT DOCUMENTS

| 5,865,059 A | 2/1999 | Alessandro |
| 7,909,078 B2 | 3/2011 | Burg et al. |

(Continued)

FOREIGN PATENT DOCUMENTS

| EP | 2404136 B1 | 12/2017 |
| FR | 3052388 A1 | 12/2017 |
| WO | 2018/009405 A1 | 1/2018 |

OTHER PUBLICATIONS

International Search Report dated Oct. 25, 2021, in corresponding PCT/EP2021/070853 (2 pages).
(Continued)

*Primary Examiner* — Leon Viet Q Nguyen
(74) *Attorney, Agent, or Firm* — VENABLE LLP

(57) ABSTRACT

A computer-implemented process for training a model for automatically recognizing positions in tire product profiles includes calculating an error term with respect to a label assigned in a reference of the interfaces searched in captured images of the tire product profiles that will serve as inputs to the neural network to be trained. A system (100) automatically recognizes interface variations captured in images of samples according to the disclosed process.

11 Claims, 4 Drawing Sheets

(51) Int. Cl.
    *G06T 7/70*       (2017.01)
    *G06V 10/774*     (2022.01)
    *G06V 10/82*      (2022.01)

(52) U.S. Cl.
    CPC .... *G06V 10/82* (2022.01); *G06T 2207/20081* (2013.01); *G06T 2207/20084* (2013.01); *G06T 2207/30108* (2013.01)

(56) References Cited

U.S. PATENT DOCUMENTS

| | | |
|---|---|---|
| 11,872,783 B2 | 1/2024 | Bessac et al. |
| 2016/0258842 A1* | 9/2016 | Taylor ................... G01B 11/22 |
| 2019/0287237 A1 | 9/2019 | de Bonfim Gripp et al. |
| 2019/0329510 A1 | 10/2019 | Bessac et al. |
| 2022/0051391 A1* | 2/2022 | Bogomolny ............. G06T 7/11 |
| 2024/0075626 A1 | 3/2024 | Dettorre et al. |

OTHER PUBLICATIONS

Q. Zhu et al., "The Defect Detection Algorithm for Tire X-Ray Images Based on Deep Learning", 3rd IEEE Int'l. Conf. on Image, Vision and Computing (ICIVC), pp. 138-142 (2018).
R. Wang et al., "Tire Defect Detection Using Fully Convolutional Network", IEEE Access, vol. 7, pp. 43502-43510 (2019).
H. Bhamare et al., "Quality Inspection of Tire Using Deep Learning Based Computer Vision", Int'l. J. Eng. Res. & Tech. (IJERT), vol. 8, No. 11, pp. 701-704 (2019).

* cited by examiner

[Fig. 1]
PRIOR ART
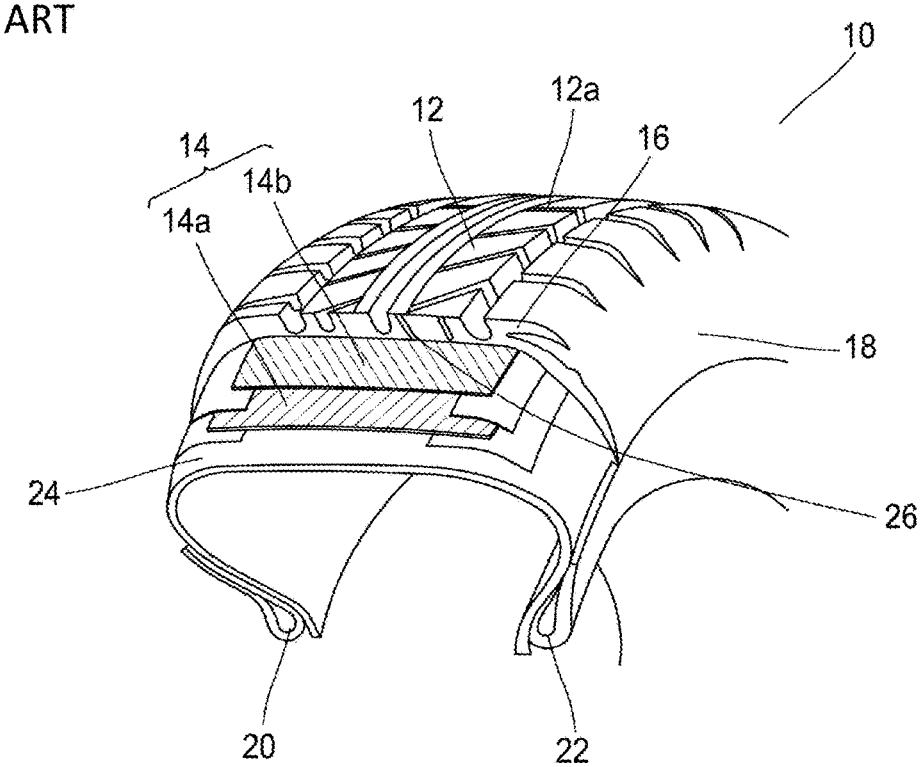
[Fig. 2]
PRIOR ART
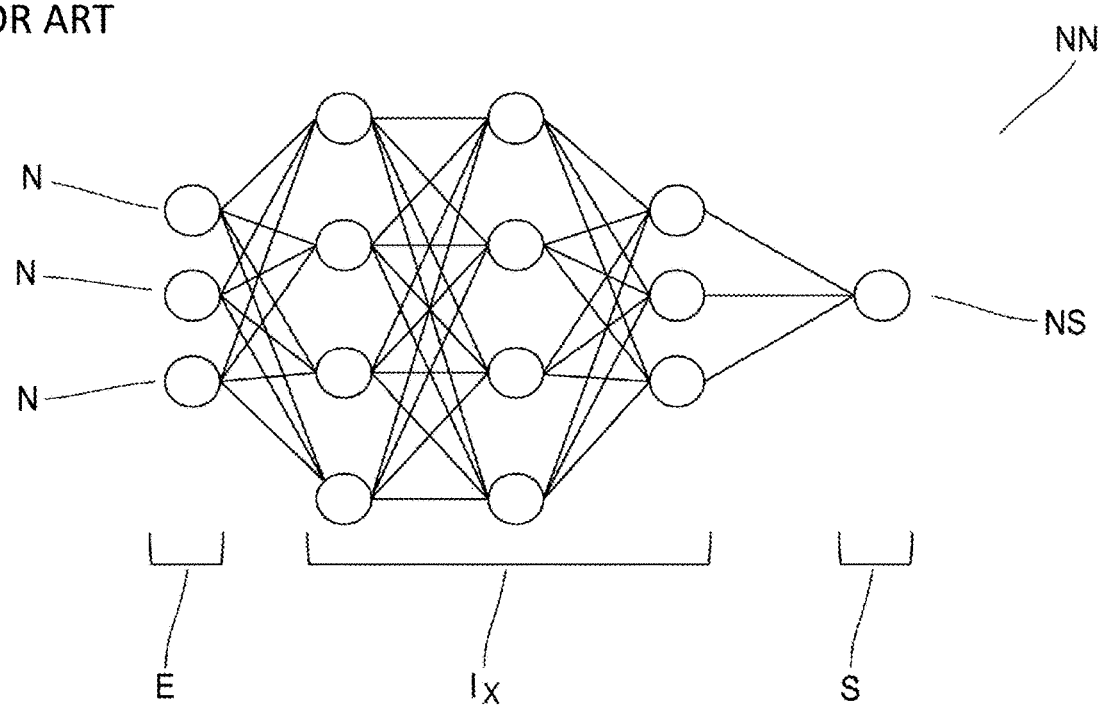

[Fig. 3]
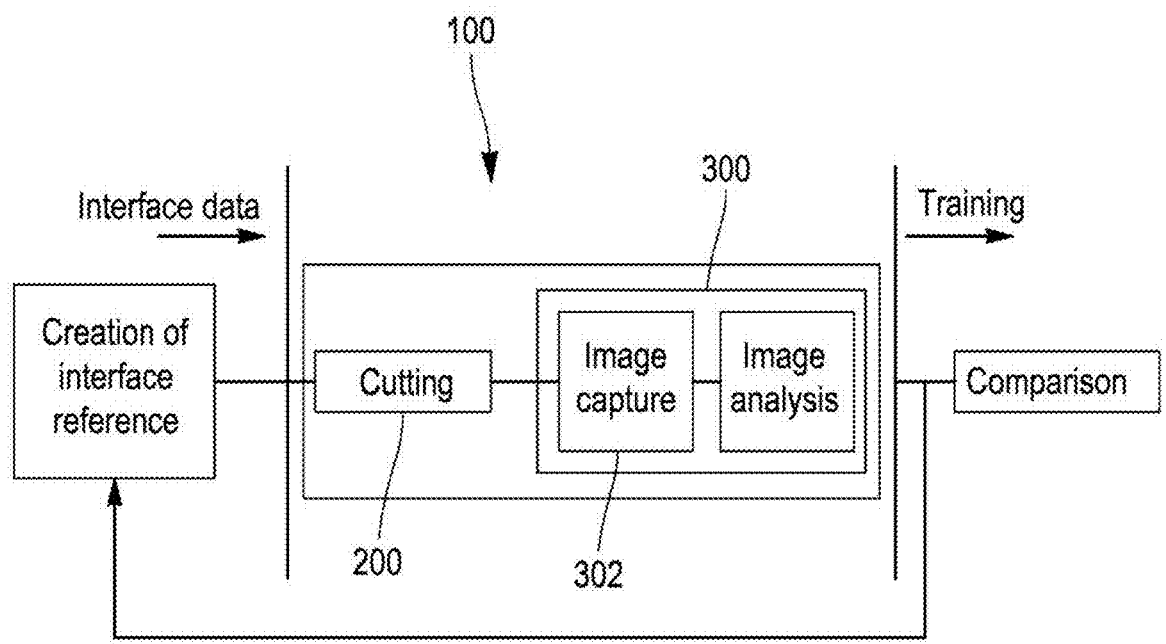
[Fig. 4]
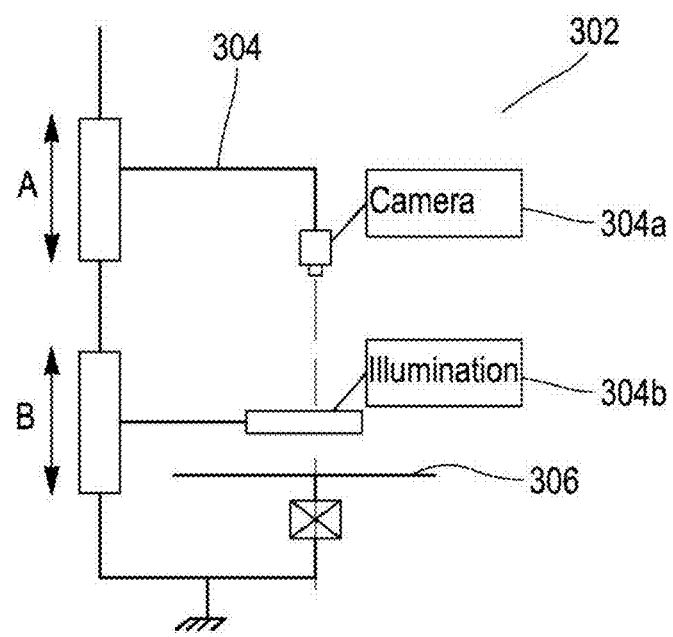

[Fig. 5]
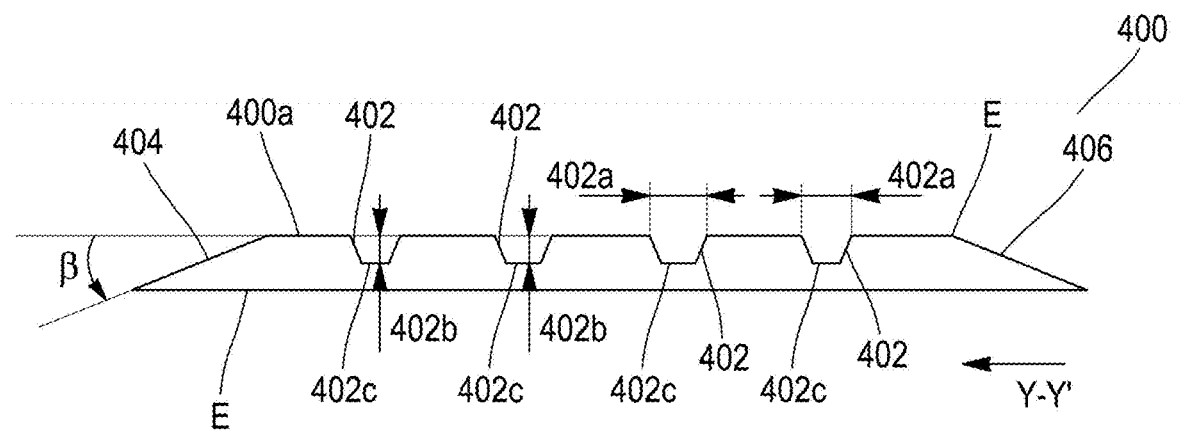
[Fig. 6]
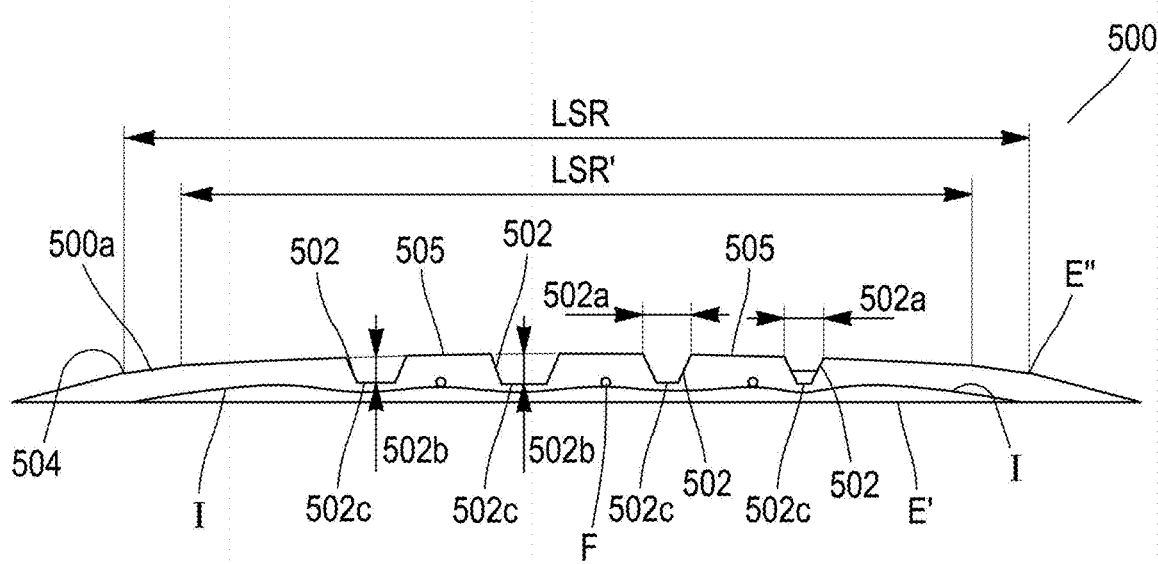

[Fig. 7]
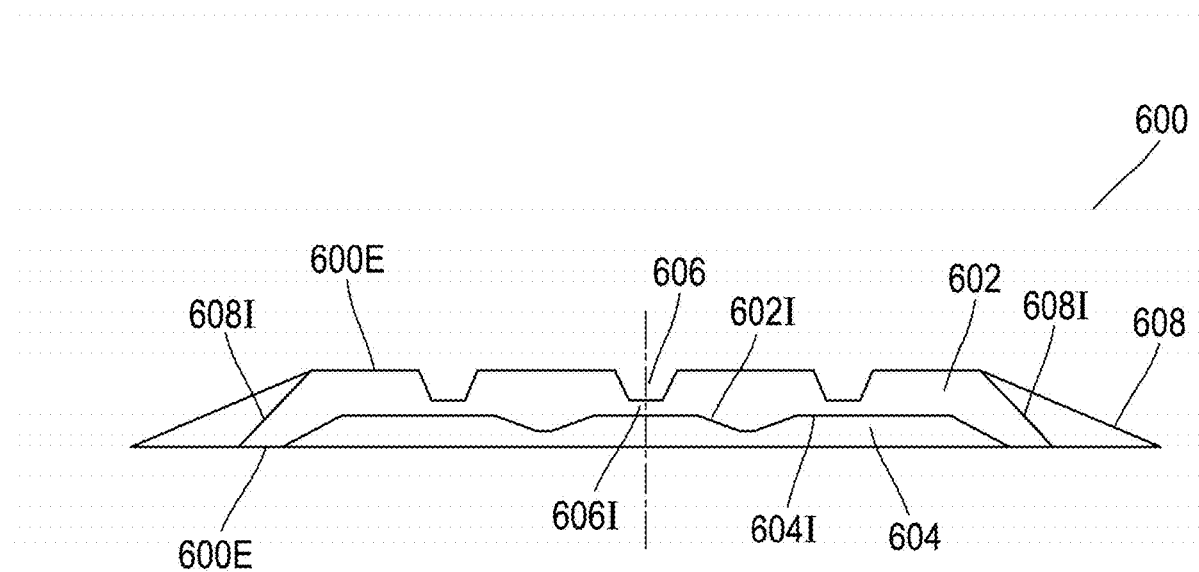

SYSTEM AND PROCESS FOR AUTOMATIC INTERFACE RECOGNITION IN TIRE PRODUCT PROFILES

TECHNICAL DOMAIN

The invention is directed to a process for training a model for automatic recognition of material variations in tire product profiles (including the production of products for incorporation into tires).

BACKGROUND

In the field of tires, it is required that the tire has various performance qualities (e.g., reduced rolling resistance, improved wear resistance, comparable grip in wet and dry conditions, sufficient mileage, etc.). A tire is an object with a known geometry generally incorporating several superimposed layers of rubber (or "plies"), as well as a metallic or textile fiber structure constituting a carcass to reinforce the tire structure. The nature of the rubber and the nature of the reinforcement are chosen according to the desired final characteristics.

The tire also includes a tread, added to the outer surface of the tire. Referring to FIG. 1, a representative tire 10 has a tread 12 intended to contact the ground through a tread surface 12a. The tire 10 further includes a crown reinforcement having a working reinforcement 14 and a hoop reinforcement 16, the working reinforcement 14 having two working layers 14a and 14b. The tire 10 also includes two sidewalls (one sidewall 18 shown in FIG. 1) and two beads 20 reinforced with a bead core 22. A radial carcass layer 24 extends from one bead to the other surrounding the bead core in a known manner. The tread 12 has reinforcements consisting of, for example, superimposed layers having known reinforcing threads. In embodiments of the tire 10, the tire may include a rubber 26 that evacuates static electricity generated during driving.

During tire production, tire samples are studied to develop different tire performance qualities. These samples include tire sections that reveal the overall cross-sectional profile of the tire product (or "product profile") as well as the cross-sectional profile of each layer used to construct the final tire product ("layer profile"). These sections also reveal the boundaries between adjacent superimposed layers ("boundary" or "limits" of the layer(s)) and whether these boundaries are properly aligned with each other to ensure the integrity of the final tire.

Several solutions already exist to measure parameters that govern the proper incorporation of layers into a product profile. For example, U.S. Pat. No. 5,865,059 discloses an apparatus using a hydraulic backscatter sensor to measure the thickness of non-metallic materials in film form and their equivalents. U.S. Pat. No. 7,909,078 discloses a system incorporating a laser that scans a surface of a product profile and means for generating real-time incremental measurement data (being a system for measuring the outside of product profiles without the ability to measure the inside of complex profiles). European Patent EP2404136 discloses an apparatus for measuring a tire tread that incorporates a plurality of light emitting means, reflecting means and imaging means for measuring a depth of the tread.

In the field of artificial intelligence, networks of neurons (also called "neural networks") are well known. Their basis is to be "trained" on a large number of situations. By adjusting the weighting coefficients in a learning phase, the performance of neural networks can describe a new situation presented to them. For example, neural networks such as GoogleNet, Inception or Resnet are known for object recognition and classification. In a specialized example, the "Profound AI" (or "Deep AI") algorithm is specialized in the search for cancerous tumors (see the publication "Artificial Intelligence for Digital Breast Tomosynthesis—Reader Study Results", https://www.icadmed.com/assets/dmm253-reader-studies-results-rev-a.pdf).

Referring to FIG. 2, a representative architecture of an artificial neural network (also called "ANN") is given as an example. The neural network NN in FIG. 2 includes an input layer E having one or more neurons $N_E$, one or more hidden layers (also called "intermediate" layers) $I_X$ (where X varies from 1 to N depending on the number of hidden layers in the network employed), and an output layer S having one or more neurons $N_S$. Through an algorithm designed to change the weight of connections in the network, the neural network allows learning from new data (e.g., to perform a specific task by analyzing examples for training).

It is understood that the neural network NN is given as an example, and that several types of neural networks are known that can use distinct learning methods, including supervised learning (in which the network NN, trained on a set of labeled data, modifies itself until it is able to obtain the desired result), unsupervised learning (in which the data is not labeled so that the network can adapt to increase the accuracy of the algorithm), reinforcement learning (in which the neural network is reinforced for positive results and sanctioned for negative results), and active learning (the network asks for examples and labels to refine its prediction) (see https://www.lebigdata.fr/reseau-de-neurones-artificiels-definition). Examples of neural networks are presented in the prior art (see, example "The Neural Network Zoo", Fjodor Van Veen, https://www.asimovinstitute.org/neural-network-zoo/)(Sep. 14, 2016).

In addition, the introduction of deep learning algorithms has improved the performance of object detection, localization, identification and classification. In several domains, much of the performance of an imaging system already comes from its ability to handle multiple images and "overlay" their interpretations. For example, publication WO2018/009405 discloses an instance segmentation system coupled to an acquisition system to perform automatic detection and localization of an anatomical object (an internal object) in an image generated by an imaging system. The system associates a very specific hardware with artificial intelligence in order to perform segmentation. The goal is not to measure anything but to detect and identify an element in the image. Moreover, the system is composed of several neural networks for localization and classification, and for segmentation.

US20190287237 discloses a system for analyzing an automobile body (external surfaces) over which a photographic acquisition system passes. This system is coupled to an algorithm based on artificial intelligence to analyze the reflections of the bodywork and deduce whether defects (e.g., dents) are present, using histogram normalization in this system.

In the field of tires, it is therefore possible to add lighting and perspective to have the profiles of the product viewed from different angles, in order to identify its internal contours with more precision. The detection and segmentation of the products during the production process allows searching, finding and identification of the product profiles and the limits between them. Thus, it is important to detect nonconformity with product profile parameters and signal the need for intervention prior to the execution of downstream production processes.

Thus, the disclosed invention fulfills a need for quality measurement of layers/plies to ensure the performance of pneumatic products. To avoid expensive hardware solutions that are not adaptable to each plant, the proposed invention uses a training based on neural networks and images. This training can be adapted to each plant and automates the quality measurement of external and internal profiles.

SUMMARY OF THE INVENTION

The invention is directed to a computer-implemented process for training a model for automatic recognition of positions in tire product profiles, characterized in that the process includes the following steps:

- a step of providing a system for automatically recognizing interfaces captured in images of the tire product profiles;
- a step of creating a reference of the interfaces searched in the captured images of the tire product profiles, the interface reference including superimposed layers in product profiles and the interfaces therebetween that are revealed by the captured images;
- for each of a set of tire samples obtained from one or more tire products:
  - a step of capturing images of the tire product profiles that is performed by the system;
  - a step of analyzing the captured images;
  - a neural network training step in which the captured images are cut into thumbnails and labeled, in which the neural network takes as input the thumbnails of the same size, and in which the neural network outputs a corresponding image of the same size that represents its prediction of the position of the interfaces of the product profiles; and
  - a comparison step during which predictions of the positions of the interfaces of the product profiles are used to build at least one model representing the true interfaces in the captured images with respect to the interfaces predicted in the interface reference;
- whereby the image output from the neural network is compared by calculating an error term with respect to the label assigned in the interface reference, with an offset between the true interfaces and the predicted interfaces being denoted by a residual error between the prediction of the position of the interfaces of the product profiles and the model built during the training step, such error indicating a variation in the sample.

In some embodiments of the process, the process also includes a cutting step to obtain at least one sample from the one or more tire products.

In some embodiments of the process, the step of capturing images of the tire product profiles includes a step of capturing the images under various encoded illuminations.

In some embodiments of the process, the comparison step includes a step of measuring the accuracy of the neural network during which the neural network is assigned a metric value that represents a measure of its accuracy.

In some embodiments of the process, the step of measuring the accuracy of the neural network is performed in an iterative manner until a constant metric value greater than 0.5 is attained.

In some embodiments of the process, the process further includes a step of feeding the cut sample to the system.

In some embodiments of the process, the step of creating the interface reference includes a neural network training step during which the neural network takes as input the true positions of the interfaces.

The invention also relates to a system for automatically recognizing variations in interfaces captured in images of samples according to the disclosed process, characterized in that the system includes an imaging installation that performs the image capture, training and comparison steps, wherein the imaging installation includes a digital profile projector that is configured to recognize from a sample a selected product profile in correspondence with an automatic selection of the corresponding control program of the projector, the projector incorporating at least one processor.

In some embodiments of the system, the projector includes an image capture device that captures images of the obtained tire samples.

In some embodiments of the system, the image capturing device includes:

- a substantially planar tray with a predefined capture area;
- a camera capable of capturing images of the sample placed in the predefined capture area; and
- an illumination source having one or more illuminators to serve as a light source on the sample during the capture of images of the sample.

In some embodiments of the system, the system further includes a cutting installation having a cutting system for cutting the rubber products and from which at least one sample is obtained from the one or more tire products.

Other aspects of the invention will become apparent from the following detailed description.

BRIEF DESCRIPTION OF THE DRAWINGS

The nature and various advantages of the invention will become more apparent from the following detailed description, in conjunction with the accompanying drawings, in which the same reference numerals designate identical parts throughout, and in which:

FIG. 1 represents a schematic cross-sectional view of an embodiment of a known tire.

FIG. 2 represents an embodiment of a known artificial neural network.

FIG. 3 represents a schematic view of an embodiment of an automatic recognition process of the invention.

FIG. 4 represents a schematic view of an embodiment of an imaging installation of an automatic recognition system of the invention.

FIGS. 5 and 6 represent representative images that are obtained by the imaging installation of FIG. 4.

FIG. 7 represents a side section view of a sample of a tread treated during a process to train an automatic recognition model of the invention.

DETAILED DESCRIPTION

Referring now to FIGS. 3 and 4, in which the same numbers identify identical elements, FIG. 3 depicts an automatic interface recognition system (or "system") 100 of the invention. The system 100 performs a process for automatically recognizing variations among interfaces captured in images of tire product profiles. In the performed process, images are obtained of tire product sections (or "samples"), such as the overlapping layers in the tire construction, using deep learning algorithms that are implemented via commercially available imaging systems.

The samples processed by the system 100 include cross-sections of tire products of the type depicted in FIG. 1. The tire is a complex rubber profile element, being a profile element composed of different profile elements made from different elastomeric compounds and assembled to each other. Considering that the tire is required to have various performances (e.g., reduced rolling resistance, improved wear resistance, comparable grip in wet and dry conditions, sufficient mileage, etc.), the tire may include superimposed rubber layers, including reinforced rubber layers, having different rubber compounds selected according to the desired final characteristics.

The constitution of the tire is typically described by a representation of its constituents in a meridian plane, i.e., a plane containing the axis of rotation of the tire. The radial, axial and circumferential directions refer respectively to the directions perpendicular to the axis of rotation of the tire, parallel to the axis of rotation of the tire, and perpendicular to any meridian plane. The terms "radially," "axially," and "circumferentially" mean "in a radial direction," "in the axial direction," and "in a circumferential direction" of the tire, respectively. The terms "radially inward" and "radially outward" respectively mean "closer to", or "further from", the axis of rotation of the tire in a radial direction.

Referring again to FIG. 3, the system 100 includes a cutting installation 200 where samples are obtained from a tire product or products. The cutting installation 200 includes a cutting system with cutting means that are known to cut rubber products, including, without saw(s), blade(s), knife(s), and/or their equivalents. At least one scrolling means (e.g., one or more conveying axes) conveys the tire product to the cutting means along a predefined scrolling path. The scrolling means may include a lateral holding device that provides substantially linear and aligned positioning of the tire product relative to the cutting means. The scrolling means transports the samples obtained from the cutting means to an installation downstream of the cutting installation 200 where an automatic recognition process is performed. In one embodiment of the cutting installation 200, each cutting means may be coupled with a linear actuator that adjusts the position of the cut sample (e.g., to ensure relative alignment between the tire product and the cutting means that achieves an optimized cut). Each linear actuator operates as known (for example, pneumatically or hydraulically). By way of example, the cutting system may include a tread profile cutting device of the type disclosed in Applicant's patent FR3052388.

Referring again to FIG. 3, and further to FIG. 4, the system 100 further includes an imaging installation 300 where images of sample interfaces are obtained. The imaging installation 300 can be integrated into already installed tire production lines.

FIG. 4 represents an embodiment of a digital profile projector (or "projector") 302 installed at the imaging installation 300 and incorporating at least one processor (not shown) that is configured to detect, locate, and segment one or more sample images captured by the projector. The term "processor" refers to a device capable of processing and analyzing data and including software for processing the same e.g., one or more integrated circuits known to the person skilled in the art to be included in a computer, one or more controllers, one or more microcontrollers, one or more microcomputers, one or more programmable logic controllers (or "PLCs"), one or more application-specific integrated circuits, one or more field-programmable gate arrays (or "FPGAs"), and/or one or more other known equivalent programmable circuitry). The processor includes software for processing the images captured by the imaging installation (and the corresponding data obtained) as well as software for identifying and classifying product profiles and the interfaces between layers overlaid therein.

The projector 302 may be selected from commercially available optical vision systems. In the embodiment shown in FIG. 4, the projector 302 is a two-dimensional (or "2D") measuring system incorporating a recognition of a sample a product profile, which system is chosen in correspondence with an automatic selection of the corresponding control program. It is understood that the projector 302 may be selected from commercially available projectors for measuring objects (including samples obtained at the cutting installation 200) and for recording the measurements obtained (for example, the projector 302 may be of the type offered by the Ayonis company, but it is understood that other equivalent projectors may be used).

The projector 302 includes an image capture device (or "device") 304 that captures images of the sample obtained at the cutting installation 200. The projector 302 further includes a substantially planar sample tray (or "tray") 306. The tray 306 includes a predefined capture area (or "zone") in which the sample is placed during the capture of images of the sample. The image(s) captured by the device 304 is transmitted to an image processing device (e.g., processor) that can process, identify, and classify the product profiles incorporated in the samples. It is understood that the position of the tray 306 can be changed in a rotatable manner relative to the device 304 to capture sample images at several different angles.

The image capture device 304 includes a camera 304a such as a video and/or photographic camera, an infrared camera, an ultraviolet camera, a set of electromagnetic sensors capable of capturing an image, and their equivalents. The image capture device 304 also includes an illumination source 304b having one or more illuminators (e.g., known programmable LEDs) to serve as a light source on the sample. The illuminators may be encoded in the device 304, or they may be pre-coded during a neural network training process (e.g., using computer program(s) incorporating data representative of the illuminations and images of known tire product profile interfaces). Changes in the illumination source 304b, which are captured in sample images obtained by the camera 304a, are represented by pixels of different color intensity. For example, the obtained sample images may contain indications of reflection due to a change in illumination. Thus, the image captured by the image capturing device 304 reveals the overlapping layers in the product profile as well as the interfaces between them. The camera 304a and the illumination source 304b can move in an alternating or random manner to adjust, respectively, the objective and the illumination based on the parameters of the sample placed in the capture area of the tray 306 (e.g., based on its length) (see arrows A and B in FIG. 4).

Referring again to FIGS. 3 and 4, and further to FIGS. 5 and 6, FIGS. 5 and 6 depict representative images that are obtained by the projector 302.

Each of FIGS. 5 and 6 depicts a meridian cross-section of a sample tire product profile in the form of a tread. It is understood that the sample from which the image(s) are generated by the imaging installation 300 may take another product profile shape. FIG. 5 depicts an image of a tire product profile in the form of a tread 400. The tread 400 is intended to contact a ground via a tread surface 400a. In the sampled tire architecture, a plurality of circumferential grooves (or "grooves") 402 are disposed in the tread 400, each with a predefined width 402a and depth 402b (it is understood that the width and depth of the grooves 402 may be different from one groove to another). The depth 402b of a groove 402 represents the maximum radial distance between the rolling surface 400a and a bottom face 402c of the groove.

In FIG. 5, where the tread 400 is substantially continuous with the outer axial surface of the tire, the tangent to the tread is plotted on a meridian cross-section of the tire at any point on such tread in the transition zone to the sidewall. The first axial edge 404 is the point where an angle R is defined between this tangent and an axial direction Y-Y' (i.e., the radially outermost point). The same procedure will be followed to determine the second axial edge 406 of the tread 400. The image of the profile of the tread 400 that is captured by the projector 302 is represented by the outer contour E.

FIG. 6 depicts an image of a second tire product profile in the form of a tread 500 with a tread surface 500a, with FIG. 6 also depicting the axial width of the tread surface LSR and the axial width of the off-shoulder tread surface LSR'. In the sampled tire architecture shown in FIG. 6, a plurality of grooves 502 are disposed in the tread 500, each with a predefined width 502a and depth 502b (it is understood that the width and depth of the grooves 502 may be different from one groove to another). In FIG. 6, the axial edge 504 is determined by the projector 302. A radial distance is defined between a radially outer surface of an overlying corrugated layer (e.g., as designated by point F in FIG. 6) and the radially outermost point of a rib 505, which distance is plumb with the center of a bottom face 502c of the groove 502. A radial distance is defined between the radially outer surface of the radially outermost overlay layer and the radially outermost point of the rib 505 at a level of a corrugation of the overlay layer (e.g., as designated by point F in FIG. 6). In embodiments of the tire incorporating a wear indicator, a radial distance may be defined between the tread surface 500a and the radially outermost point of the wear indicator. The image of the tread profile 500 that is captured by the projector 302 is represented by the outer contour E' and the inner contours I.

The projector 302 uses known tools (e.g., optical, mathematical, geometric, and/or statistical tools) and programmable illumination together with software that allows for sample inspection, evaluation of measurement results, and monitoring and use of control means. The projector 302 includes one or more programming modes, including learning, feeding, modifying and training a neural network. Semantic segmentation is chosen over instance segmentation so that the invention can generalize to any product profile. As used herein, "semantic segmentation" refers to a process in which a label is assigned to each pixel in an image to treat multiple objects of the same class as a single entity. A general semantic segmentation architecture can be thought of as an encoder network (e.g., a pre-trained classification network such as GoogleNet, Inception, Resnet, or an equivalent or equivalents of such networks) followed by a decoder network. The processor can use the ground truth data to train and/or expand the neural network to automatically detect the space where the object (e.g., product profile) is supposed to be located and/or the surrounding rubber space. The ground truth data is represented in an interface reference created during an automatic recognition process of the invention (described below).

A light projection from the illumination source 304b is reflected onto the sample, and the resulting image capture is obtained by the projector 302. The image is composed of a matrix of pixels, each pixel having a different color and brightness that indicates the position of the sample's layer profile. The software used to identify variations along the layer profile can transform the captured image into a set of 2D images, each image being identical to within one illumination variation of the product profile boundary (or a variation of the layer profile). The resulting image variations, revealing a position or positions of the product profile boundary, train the neural network to identify all positions of the product profile boundary. These image variations serve as input to the neural network whose output is the classification of the positions as a profile boundary or not. The purpose of the algorithm is to automatically identify and indicate the external profile of the sample as well as the internal interfaces between the profiles of the layers, and then to give the exact measurements of the external and/or internal profiles. It is understood that any neural network can be implemented, including but not limited to convolutional neural networks and their equivalents.

Segments classified as incorporating variation (and thus a potential anomaly) are overlaid on the original image. In embodiments of the invention where this step includes capturing multiple images, each image includes the variation displaced from the previous image, so that all points of the variation are shown relative to the rest of the sample. Different variations may have different parameters and/or "weights," and thus will be treated differently when feeding the classification algorithm.

In some embodiments of the system 100, multiple sets of dimensional scales may be analyzed independently so as to create a multi-scale classifier. In these embodiments, the multi-scale classifier may span information from all classifiers, and it may show all segments of variation.

The projector processor 302 continuously trains the neural network from the newly captured data of the sample images obtained by the projector. In order to automatically detect the boundaries between the layers of the product and/or the surrounding rubber, the projector 302 takes images (which may include video) and collects a data set of images of the product profile and/or surrounding rubber from multiple product samples. Prior to being recorded, the image data set may be annotated based on user input to create the ground truth data. For example, in some embodiments, to assist the neural network in detecting and identifying profile boundaries and/or the surrounding rubber, the image data set is annotated, and known variations are identified manually, based on the knowledge of tire professionals. As such, ground truth data as described herein generally refers to information provided by direct observation by professionals in the field as opposed to information provided by inference. They may have data from multiple sources, including multiple professionals in remote locations, to develop the neural network. A feedback loop of annotated images may be updated with additional ground truth data over time to improve the accuracy of the system 100.

The dataset of images may be divided into multiple groups (e.g., the ground truth data may be divided into groups including at least a training dataset and a validation dataset). In some embodiments, the processor may be configured to implement supervised learning to minimize the error between the neural network output and the ground truth data (referred to as "supervised learning"). It is understood that other deep learning techniques may be used, including but not limited to reinforcement learning, unsupervised learning, etc. In some embodiments, the development of the training data may be based on a reward/punishment function, such that there is no need to specify labeled data.

The neural network can be used in near real time to provide predictions on validation data as well as on newly captured data. The neural network can be trained to locate and segment product profile data (defined as product profile boundary data). The neural network can also be trained to locate and segment layer profile data (defined as layer profile boundary data that may include surrounding rubber data). The differences between training the neural network to localize the product profile object and training the neural network to segment the profile object include how the data is labeled and the architectural details.

It is understood that the neural network may be trained with data from images acquired by the projector 302 from multiple samples. It is also understood that the neural network may be trained by multiple imaging installations (including those of the type represented by the imaging installation 300) that have acquired profile data from multiple samples over time. For all embodiments, there may be variations in image size, intensity, contrast and/or texture. Thus, the system 100 uses an innovative process to build large sets of labeled training, and thus form a network large enough to effectively utilize all the acquired data.

Referring again to FIGS. 3 to 6, a detailed description is given as an example of an automatic recognition process (or "process") of the invention performed by the system 100.

In initiating an automatic recognition process of the invention, the automatic recognition process includes a step of creating a reference of the interfaces searched in images to be captured by the projector 302. The interface reference that is created during this step includes expected images corresponding to superimposed layers in product profiles and the interfaces therebetween that are revealed by the images captured by the projector (including the outer contours and inner contours of the product profiles). This step can be performed in advance of other steps in the process to feed the neural network the true positions of expected interfaces by analyzing the captured images. This step includes creating negatives of the captured images, with each negative being a "label" or being "labeled". In embodiments of the process, at least a portion of the interface reference is created by a person or persons skilled in the art.

The automatic recognition process further includes a cutting step to obtain one or more tire product profile samples. This step, being performed by the cutting installation 200 of the system 100, can be performed in an iterative manner depending on the number of samples provided to feed the neural network. In embodiments of the process, this step includes the step of cutting a tire in a meridian cut that is used to determine the different radial distances, the center of the bottom faces of the grooves and furrows. If it is necessary to change the cutting medium (either during the cutting step or between process cycles), the system 100 allows for a quick re-training of the neural network.

The automatic recognition process further includes a step of capturing images of the cut sample, this step being performed by the projector 302, and more particularly, by the image capture device 304. This step includes the step of placing the cut sample in the capture area of the tray 306 of the device 304. This step further includes capturing the images under various illuminations performed by the illumination source 304b of the device 304. The illuminations may be made according to the number of images to be captured with automatic focus. In one embodiment of the system 100, the system may transport the cut sample to the tray 306. In this embodiment, the step of capturing the images further includes a step of transporting the cut sample to the tray 306, which step includes the step of placing the sample in the capture area of the tray.

It is understood that each captured image may include traces reflected from a darker area of the rubber material where there is no direct incidence of light. In this case, the image is composed of a matrix of pixels having different colors and brightness.

In one embodiment, during the image capture step, the projector 302 can automatically produce multiple high-resolution images by varying the lighting incidence configuration and intensity. The intensity is intentionally varied to increase the robustness of the neural network. Instead of training the neural network on the basis of the same intensity, where it would be too sensitive to possible variations due, for example, to a loss of luminosity (due to ageing of the diodes, soiling of the screen or environmental modification), the acuity of the neural network is ensured.

The automatic recognition process of the invention further includes a step of analyzing the images captured by the projector 302. As an example, each of the curves represents a fringe (a curve being represented by the internal profile I of the image captured in FIG. 6). Each fringe is divided into segments. The criterion for dividing the fringe into segments can be simply to divide each fringe into segments of the same pixel size. From the geometry and the curvatures, features are extracted that feed an anomaly classification algorithm. The features mentioned herein may include, without limitation, the geometric characteristics of the segment and/or the curvature statistics computed for each point in the segment (including, without limitation, the curvature sum, mean, variance, kurtosis, or combinations of these statistics). In addition, a tolerance value can be derived from the curvatures, below which the curvatures would not be considered in the calculation of the boundary profile positions.

The automatic recognition process of the invention further includes a training step during which the captured images are cut and labeled into even smaller thumbnails. In particular, a desired number of thumbnails is defined, these thumbnails being treated as a singular set. Thus, a set of one or more predetermined thumbnails coupled with their label (and thus being "labeled") is considered a training example. Each training example consists of a set of thumbnails with their label. The thumbnails allow to significantly multiply the number of available examples that provide not only the classes (i.e., the labels) but also additional information about the spatial location of these classes with respect to the rubber region.

During the training step, the neural network takes as input the thumbnails of the same dimension, and it outputs a corresponding image of the same dimension that is its prediction of the position of the product profile interfaces ("output image" of the neural network). The predictions of the product profile interfaces are used to construct a model or models representing the true interfaces in the captured images relative to the predicted interfaces in the interface reference. An offset between the true interfaces and the predicted interfaces is denoted by a computed error, such an error indicating a variation (and perhaps a potential anomaly) in the sample. The calculated errors can be entered into the interface reference to expand the reference (see FIG. 3).

The automatic recognition process of the invention further includes a comparison step during which the image output from the neural network is compared by calculating an error term with respect to the label assigned in the reference of the interfaces. A residual error between the prediction of the position of the interfaces of the product profiles and the model (built during the training step) is then used in an optimization process that is part of this comparison step. By performing a stochastic gradient descent (more or less refined depending on the magnitude of the error), the parameters of the neural network are modified to decrease this residual error.

The comparison step includes a step of measuring the accuracy of the neural network. During this step, the neural network is assigned a value called a "metric" (for example, a value ranging from 0 to 1) that represents a measure of its accuracy. The higher the metric, the more accurate the model is (in the sense of the metric). This step can be performed iteratively until a constant metric greater than at least 0.5 is reached.

At the end of the comparison step, the resulting model after all iterations is called a "trained model" that is saved. The trained model allows for fine-grained inference by making dense predictions by deducing labels for each pixel, so that each pixel is labeled with the class of the corresponding object (the variation) and the region surrounding it (the rubber). Now, to predict the location of an interface(s) in the captured images of the samples, one cuts the number of images defined during the training step without the need to label them. The system 100 is therefore very flexible in that it only needs captured images to perform the process of the invention.

The system 100 of the invention is thus based on a neural network whose basis is to be trained on a large number of situations (for example, images of samples) in order to then be able to describe a new situation that would be presented to it. On the one hand, the neural network must be told what it should recognize, and then taught ("annotation"). On the other hand, it is necessary to assess the performance of the neural network and propose relevant samples to avoid falling into certain biases such as overtraining that will decrease the performance of the network, or even obviate its usefulness.

The automatic recognition process of the invention is performed by the system 100 in a reduced time compared to known quality measurement devices (for example, by profilometer systems). For example, the disclosed process now takes a few seconds for more than 10,000 pixels instead of some minutes for 10 to 15 points manually (points whose number will increase with increasing complexity of tire product profile interfaces).

With the system 100, the internal and external interfaces can also be obtained immediately, their images being made accessible by the same system using the same software. The process of the invention is therefore easily adapted by internal teams for all tire architectures. As an example, FIG. 7 depicts a side section view of a sample of a tread 600 that can be processed during the process of the invention. The depicted tread 600 incorporates a wear and road grip layer 602, a profiled inner liner (or "sublayer") 604, and a layer 606 of a rubber that evacuates static electricity generated during driving. A profile of a joint cover 608 is also incorporated that serves as a side impact protection. In the captured images, the outer profile 600E is well revealed along with the inner profiles (see profile 602I, profile 604I, profile 606I, and profile 606I in FIG. 7) to achieve automation of point measurement. It is understood that samples with other product profiles will have their captured images fed to the neural network to build the model.

To attain industrial productivity, the use of a solution incorporating artificial intelligence allows the replacement by "algorithmic" description of the cases that one seeks to detect, by a learning and a work-by-example that is simpler to implement but more difficult to interpret once the result is given by the system. The disclosed invention, with localization and detection, thus eliminates the need for image pre-processing. This solution is not only very efficient, but also flexible and adaptable on a case-by-case basis if needed or if the operating conditions should evolve.

The system 100 is suitable for tires made from a variety of rubber compounds, without reducing industrial productivity. Therefore, the invention takes into account the quality of the measured and analyzed parameters to ensure the quality of the tires.

The automatic recognition process of the invention can be done by PLC control and can include pre-programming of management information. For example, a process setting may be associated with tire parameters, rubber material properties and operating parameters of the layer(s) interfacing with each other.

In embodiments of the invention, the system 100 (and/or an installation incorporating the system 100) may receive voice commands or other audio data representing, for example, a start or stop in capturing images of a sample placed on the tray 306. The command may include a request for the current state of an automatic recognition process cycle. A generated response may be represented audibly, visually, tactilely (e.g., using a haptic interface) and/or in a virtually and/or augmented manner.

In all embodiments of the system 100, a monitoring system could be implemented. At least a portion of the monitoring system may be provided in a wearable device such as a mobile network device (e.g., a cell phone, a laptop computer, a network-connected wearable device(s) (including "augmented reality" and/or "virtual reality" devices, network-connected wearables and/or any combinations and/or equivalents). It is understood that detection and comparison steps may be performed iteratively.

The terms "at least one" and "one or more" are used interchangeably. Ranges that are presented as being "between a and b" include both "a" and "b" values.

Although particular embodiments of the disclosed apparatus have been illustrated and described, it will be understood that various changes, additions, and modifications may be practiced without departing from the spirit and scope of this disclosure. Accordingly, no limitations should be imposed on the scope of the described invention except those set forth in the appended claims.

The invention claimed is:

1. A computer-implemented process for training a model for automatic recognition of positions of tire product profiles of tire products, the computer-implemented process comprising the following steps:
   a step of providing a system for automatically recognizing interfaces of tire product profiles, the interfaces of the tire product profiles being represented in images of the tire product profiles;
   a step of creating an interface reference of interfaces that are searched in the images of the tire product profiles, the interface reference including superimposed layers in tire product profiles and interfaces between the superimposed layers that are revealed by the images of the tire product profiles;
   for each of a set of tire samples obtained from one or more tire products, a step of capturing the images of the tire product profiles, which is performed by the system;
   a step of analyzing the images of the tire product profiles;
   a neural network training step in which the images of the tire product profiles are cut into thumbnails and labeled, in which a neural network takes as input thumbnails of a same size, and in which the neural network outputs a corresponding image of the same size that represents a prediction, made by the neural network, of positions of the interfaces of the tire product profiles, the neural network training step including a comparison step during which predictions of the positions of the interfaces of the tire product profiles are used to build at least one model representing true interfaces in the images of the tire product profiles with respect to predicted interfaces in the interface reference, wherein an image output from the neural network is compared by calculating an error term with respect to a label assigned in the interface reference, with an offset between the true interfaces and the predicted interfaces being denoted by a residual error between the prediction of the positions of the interfaces of the tire product profiles and the at least one model built during the neural network training step, the residual error indicating a variation in the sample.

2. The computer-implemented process of claim 1, further comprising a cutting step to obtain at least one cut sample from the one or more tire products.

3. The computer-implemented process of claim 1, wherein the step of capturing the images of the tire product profiles comprises a step of capturing the images of the tire product profiles under various encoded illuminations.

4. The computer-implemented process of claim 1, wherein the comparison step comprises a step of measuring an accuracy of the neural network during which the neural network is assigned a metric value that represents a measure of the accuracy.

5. The computer-implemented process of claim 4, wherein the step of measuring the accuracy of the neural network is performed in an iterative manner until a constant metric value greater than 0.5 is expected.

6. The computer-implemented process of claim 2, further comprising a step of transporting the at least one cut sample to the system.

7. The computer-implemented process of claim 1, wherein the step of creating the interface reference comprises a step of training the neural network during which the neural network takes as input true positions of the interfaces of tire product profiles.

8. A system for automatically recognizing interface variations captured in images of a sample according to the computer-implemented process of claim 1, wherein the system comprises an imaging installation that performs the step of capturing images, the neural network training step, and the comparison step, and wherein the imaging installation comprises a digital profile projector (302) that is configured to recognize, from the sample, a selected product profile in correspondence with an automatic selection of a corresponding control program of the digital profile projector, the digital profile projector incorporating at least one processor.

9. The system of claim 8, wherein the digital profile projector includes an image capture device that captures images of the sample.

10. The system of claim 9, wherein the image capture device comprises:
a substantially planar tray with a predefined capture area;
a camera capable of capturing images of the sample when the sample is placed in the predefined capture area; and
an illumination source including one or more illuminators for use as a light source for the sample during capture of the images of the sample.

11. The system of claim 8, further comprising a cutting installation having a cutting system for cutting the one or more tire products and from which at least one sample is obtained from the one or more tire products.

* * * * *